(12) United States Patent
Alghamdi et al.

(10) Patent No.: US 7,396,189 B2
(45) Date of Patent: Jul. 8, 2008

(54) CUBIC MARINE IMPACT-ABSORBING STRUCTURE

(75) Inventors: Abdulmalik A. Alghamdi, Jeddah (SA); Abobakr M. Radwan, Dhahran (SA)

(73) Assignee: Saudi Arabian Oil Company, Dhähran (SA)

( * ) Notice: Subject to any disclaimer, the term of this patent is extended or adjusted under 35 U.S.C. 154(b) by 504 days.

(21) Appl. No.: 11/173,077

(22) Filed: Jul. 1, 2005

(65) Prior Publication Data

US 2007/0003373 A1   Jan. 4, 2007

(51) Int. Cl.
 *E02D 3/26* (2006.01)
(52) U.S. Cl. .................................................. 405/211
(58) Field of Classification Search .................. 405/211
 See application file for complete search history.

(56) References Cited

U.S. PATENT DOCUMENTS

| 1,302,293 | A | * | 4/1919 | Blazer ........................ 244/131 |
| 3,541,800 | A | | 11/1970 | Walker et al. |
| 3,564,858 | A | | 2/1971 | Pogonowski ................ 405/212 |
| 3,721,433 | A | | 3/1973 | Sobel ......................... 267/140 |
| 3,842,944 | A | | 10/1974 | Shiotani et al. |
| 3,856,268 | A | | 12/1974 | Fitch |
| 4,058,984 | A | | 11/1977 | Weidler et al. .............. 405/212 |
| 4,118,014 | A | | 10/1978 | Frosch et al. |
| 4,135,467 | A | | 1/1979 | Loire et al. |
| 4,337,009 | A | | 6/1982 | Jackson ...................... 405/212 |
| 4,337,010 | A | | 6/1982 | Sullaway et al. ............ 405/227 |
| 4,352,484 | A | | 10/1982 | Gertz et al. |
| 4,398,848 | A | | 8/1983 | Guilbeau |
| 4,492,291 | A | | 1/1985 | Chometon et al. |
| 4,645,375 | A | | 2/1987 | Carney, III |
| 4,880,088 | A | | 11/1989 | DeOliveira |
| 4,958,960 | A | | 9/1990 | Turner et al. .............. 405/195.1 |
| 4,968,184 | A | | 11/1990 | Reid ........................... 405/225 |
| 5,480,265 | A | | 1/1996 | Marshall et al. ............. 405/224 |
| 6,178,909 | B1 | | 1/2001 | Palmer ........................ 114/219 |
| 6,276,875 | B1 | | 8/2001 | Gunnar et al. .............. 405/203 |
| 6,644,893 | B2 | | 11/2003 | Johnson ...................... 405/209 |
| 6,851,892 | B2 | * | 2/2005 | Alghamdi et al. ........... 405/211 |

* cited by examiner

*Primary Examiner*—John Kreck
(74) *Attorney, Agent, or Firm*—Abelman, Frayne & Schwab (57) ABSTRACT

A sacrificial impact-absorbing and energy-dissipating structure for protecting marine facilities from the destructive force of an accidental impact by a marine vessel is constructed from a plurality of inexpensive steel pipes or tubular members that are permanently secured together as by welding to form an open three-dimensional cubic framework of plastically deformable material. One or more of the tubular members forming the structure can optionally be filled with water, a rigid foam material and/or wooden elements that will provide additional energy-dissipation capabilities in the event that the containing tube is subjected to a deforming impact. Filler ports, discharge ports, pressure relief plugs, and valves can optionally be provided on one or more of the tubular members.

20 Claims, 7 Drawing Sheets

CUBIC MARINE IMPACT-ABSORBING STRUCTURE

FIELD OF THE INVENTION

This invention relates to protective structures attached to marine facilities, such as docks, quays, off-shore gas and oil well drilling platforms and loading terminals, for absorbing potentially damaging impact forces from large vessels.

BACKGROUND OF THE INVENTION

Large marine vessels, such as cargo ships and crude oil carriers, as well as service and supply barges and ships, can inflict considerable impact damage to marine facilities in the event of an unexpected loss of power, or under storm or other adverse weather conditions. Various sacrificial impact-absorbing constructions have been proposed for use in these marine and off-shore environments. For example, U.S. Pat. No. 4,398,848 discloses a marine barrier of open tubular construction that is supported by deformable shock-absorbing members. However, the open network tubular frame construction is of metal pipes of various diameters, including those that are relatively small and have little impact energy dissipation capacity. The frame is not meant to be the principal energy absorbing element of the combined structure. There does not appear to be any suggestion that the pipes forming the barrier be filled with any material, or that the tubular barrier construction is to be destructively deformed in order to protect the supporting facility from impact with the vessel. Rather, a series of telescoping cylinders having an internal linking membrane and exterior collar function as axially pivoting shock absorber assemblies. An impact at one position along the horizontally-extending tubular barrier is transmitted to all of the absorbing elements to dissipate the force. The structure disclosed in U.S. Pat. No. 4,398,848 has a limited capability for absorbing an impact that is severe enough to destructively deform the framework. In fact, if the frame members are deformed, the shock-absorbing members may be disabled.

Various other structures have been suggested by the prior art for use in the absorption of impact energy in the marine environment to protect structural facilities. Structures of various shapes, configuration and construction are disclosed that are intended to absorb the force of an impact using resilient and elastically deformable elements. In some structures, linking elements are permanently deformed or broken, with the intention that they must be replaced to return the remaining structure to service with minimal replacement expense. In other structures, resilient elements are intended to receive and absorb or dissipate repeated impacts during normal service. For example, U.S. Pat. No. 5,480,265 to Marshall et al. discloses a tubular structure that relies on the elastic response of a compliant structural assembly that is intended to absorb the kinetic energy of an impact, and then return to its original configuration. While such structures may function to absorb a limited amount of energy, and perhaps deflect a glancing impact, such a unit can collapse under a larger impact force, absorbing little of the kinetic energy of the vessel, with the remaining excess energy being transferred to the underlying marine structure causing permanent damage.

It is therefore an object of this invention to provide a sacrificial impact-absorbing structure and methods for its construction that can be secured to marine facilities to protect them from damage due to the impact of large vessels.

It is another object of this invention to provide a protective structure for use in the marine environment that will undergo plastic deformation throughout the elements of its construction in order to provide the maximum energy absorption in the event of an impact by a marine vessel.

A further object of the invention is to provide an impact-absorbing structure that is reliable, relatively simple in design, economical to construct and easy to install.

SUMMARY OF THE INVENTION

The above objects and other advantages are provided by the present invention in which a novel impact-absorbing barrier structure is constructed from a plurality of tubular members of uniform cross-sectional configuration to provide a three-dimensional cubic structure. In a preferred embodiment, an individual unit of constriction comprises tubular members that form the framework of an open cube. The general mode of construction and use of the structure is described in detail in co-pending application Ser. No. 10/361,335 filed Feb. 10, 2003, the entire disclosure of which is incorporated by reference.

As will be explained in further detail below, specific relationships between the cross-sectional size, length and wall thickness of the tubes have been found to be important in optimizing the energy-absorbing capacity of the structures.

The present invention is directed to an improved three-dimensional sacrificial marine impact energy-absorbing structure that consists of twelve tubes welded together in a particular configuration to form an open cubic cell that is positioned in a specified orientation on a marine facility. When crushed by an approaching ship, tanker or other marine vessel, the horizontal tubes extending from the contact surface deform axially, while the tubes forming the array in the vertical impact plane deform laterally. Energy is absorbed both in the plastic buckling of tubes that are normal to the impact plane and in the plastic flattening of the tubes forming the vertical plane of the impact plane and the parallel rear plane.

Eight of the tubular elements that are relatively shorter are joined to the remaining four longer elements that are oriented with their axes parallel to the open face units of the cubic structure. In a preferred embodiment, the four longer elements are oriented with their longitudinal axes normal to the exterior vertical surface of the protected marine facility. The following terminology is used in describing the invention and its method of use.

The four longer tubes are referred to as the normal tubes. In general, the four normal tubes extend horizontally away from the marine facility supporting structure. The face of the unit mounted away from the marine facility is referred to as the plane of contact or impact surface.

The normal tubes being relatively longer are preferably welded at their ends to the shorter tubes to form the corners of the unit. With this construction, a force applied to the outer impact or contact plane must pass through or be communicated by these four normal tubes. Although this is the preferred orientation, the cubic structure will also function as a sacrificial energy-absorbing structure when attached with the longer members parallel to the facility wall.

In the presently preferred embodiments, the tubular members are fabricated from mild steel and welded together. To provide resistance to rusting and/or corrosion in the marine environment, the tubes can be galvanized or coated with other protective materials, such as polymeric materials of the types used for well casings and other underground installations.

In a particularly preferred embodiment, the tubular members are of circular cross-section. Carbon steel pipes are readily available and inexpensive. Other commercially available shapes, such as square and rectilinear tubing, can also be used. However, a round pipe offers advantages in maximizing energy-absorbing capacity when plastically deformed under destructive impact. A round cross-section also provides a more stable structure during impact and is less sensitive to the direction of the loading force.

The tubing can have an outside diameter of from about 6 inches to 15 inches or 14 cm to 30 cm, and have a wall thickness of from about 0.125 inches to 0.5 inches, or 3 mm to 13 mm. The tubing can be fabricated from carbon steel or similar material. The tubing should be of a material that can be cut and easily welded to facilitate assembly of the deformable barrier.

In one preferred embodiment, the internal space defined by the interior of the tubes comprising the assembled structure is interconnected, that is, the interior space of one tube is in fluid communication with that of some or all of the tubes to which it is joined. The internal fluid communication of this configuration is provided by cutting openings in the tubes prior to, or during the assembly of the tubes.

One or more of the tubes are optionally filled with an impact-absorbing medium. The filler medium can be a rigid polymeric foam material, such as a polyurethane formaldehyde foam or other such material. One or more of the tubes can also be filled with water and the tubes provided with pressure relief orifices that are closed by plugs that rupture or are released from their fitting when the increased pressure of an impact is transmitted through the essentially incompressible water. The number and size of the pressure relief orifices is predetermined in order to optimize the energy dissipation offered by the structure. Different members of the structure can have none, one or a plurality of orifices of varying size and pressure relief values so that they begin discharging water at different times following impact and the destructive, energy-dissipating crushing of the structure's framework. The wall of an empty tube can also be provided with one or more orifices to permit water to pass from an adjacent tube that is filled with water.

Submerged elements of the sacrificial impact-absorbing structure can be provided with small open ports to allow one or more of the tubes to fill with water that are submerged after installation on the facility to be protected. Rupture plugs and/or large pressure relief ports are optionally provided as described above.

In order to fill the tubes with an expandable rigid foam composition or with water, one or more filler ports are provided in the tubes at appropriate locations. In the embodiment where the interior of the tubes are not interconnected and in fluid communication with each other, selected tubes can be filled based on the predetermined direction(s) of probable maximum impact. For example, where a docking or tie-up platform is typically approached by barges or service ships from one direction, the impact zone and likely force vectors can be calculated, and from this information the corresponding force vectors transmitted to and through the impact-absorbing structure are determined. Thus, where the maximum impact force vector is normal to the protected facility, tubes parallel to that vector are filled with a supplemental energy-absorbing medium that will serve to further dissipate the energy of impact as the containing tube is crushed or otherwise plastically deformed.

The tubes can also be filled with a solid material such as wood. The wood can be in the form of new or used pilings, railroad ties or timber, or even smaller scraps or chips that are firmly packed into one or more of the tubes prior to assembly, but which will compress with resistance if the containing tube is deformed. A combination of rigid foam and unconsolidated wood filler material can be employed to minimize costs.

The improved structure of the invention can be attached to an offshore or other marine facility using conventional methods and hardware known to the art. Means of attachment include welding to steel supporting legs of off-shore drilling platforms, bolted bracket assemblies, steel cables, and the like.

BRIEF DESCRIPTION OF THE DRAWINGS

The invention will be further described below and with reference to the attached drawings in which.

DETAILED DESCRIPTION OF THE INVENTION

Figure 1:
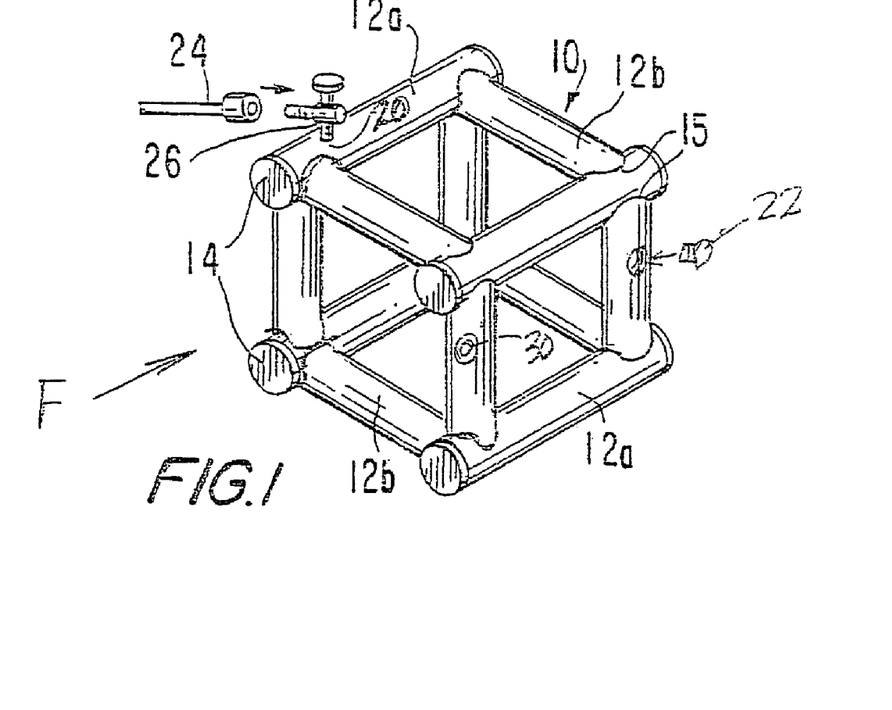
FIG. 1 is a perspective view of an impact-absorbing unit or cell structure constructed in accordance with the invention.

The invention will be further described with reference to the attached drawings where FIG. 1 schematically illustrates one embodiment of the invention in the form of a cubic impact-absorbing framework 10 formed of tubes referred to generally as 12, having a circular cross section. Tubes 12a are optionally provided with sealed exposed end caps 14. Tubes 12b are cut at their respective ends 15 to conform to the outer contour of tubes 12a. In this preferred embodiment, the tubes 12a and 12b are of the same cross-section and diameter adding to the overall impact-absorbing capability of the framework structure.

Figure 2:
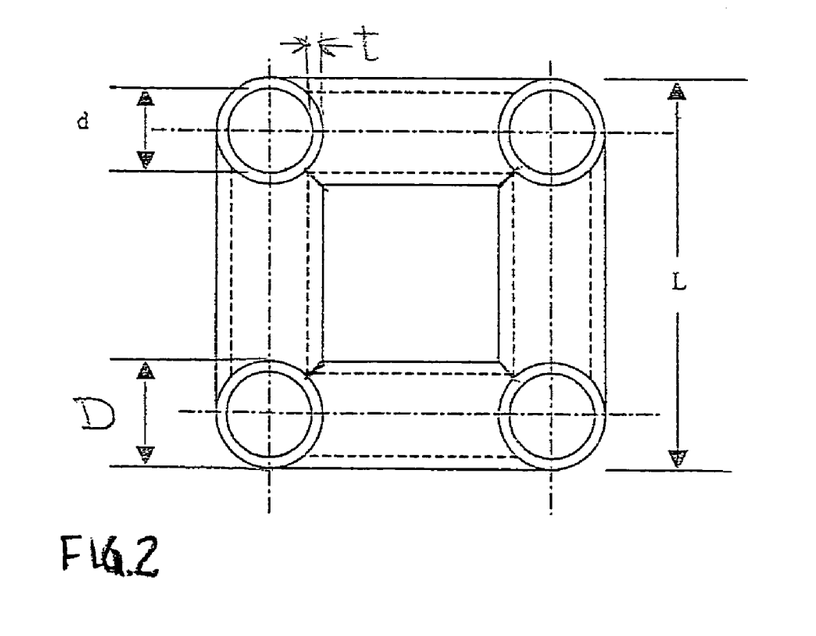
FIG. 2 is a cross-sectional view of the embodiment of FIG. 1 taken along line 2-2.

With reference to the cross-sectional view of FIG. 2, the orientation of the four normal tubes relative to the tubes forming the vertical plane is shown. In the embodiment of FIG. 1, several of the tubes 12a and 12b can be provided with optional filling ports 20 at predetermined locations to receive a flowable fluid, such as water, and/or an expandable rigid foam composition. The inlet port 20 can be a threaded plug 22, a valve 26 with threads to receive a hose fitting 24, or the like. As also illustrated in FIG. 1, one or more of the tubes 12 can be provided with one or a plurality of pressure relief or blow-off fittings 30. As explained above, these fittings are optionally employed where one or more of the tubes is filled with an incompressible fluid, such as water, that will function to slow the rate of crushing or other deformation of the tubes 12. Larger fittings can optionally be provided to permit the rapid discharge of water to minimize the likelihood that the tube 12 will rupture along a longitudinal seam, thereby diminishing its energy-absorbing capacity, and perhaps the integrity of the associated framework structure.

The ends of the shorter connecting elements are cut to the contour of the longer longitudinal elements in preparation for welding. The elements 12a that extend in the same general direction as the anticipated maximum force vector F of an accidental impact can optionally be filled with scrap lumber and timbers of random length. They can subsequently be filled with a rigid formaldehyde foam via previously installed fittings to provide additional resistance to the plastic deformation of the tubular steel elements in the event of an impact. The placement of these reinforcing materials in the elements that will absorb the maximum energy of an impact will serve to minimize damage to the hull of a barge or ship in the event of an accidental impact.

A series of laboratory-scale prototypes of the marine impact-absorbing structure were constructed and tested. The test structures were constructed in accordance with FIG. 1 where the absorber consists of four vertical tubes joined together by eight horizontal tubes. Due to the orientation of the testing machine, the cube is rotated 90° from what would be its position when mounted on a marine facility. The impact surface is therefore horizontal during the testing and is referred to as the upper unit and will be crushed to move in the direction of the lower unit. The normal tubes are vertically oriented in the testing machine.

For convenience, all of the tubes forming a test cube had the same outside diameter (D), inside diameter (d) and wall thickness (t). The length of the normal tubes which is the maximum dimension of the cube, is L. The remaining tubes ones are shorter by approximately two times the outside diameter (D), as shown in FIGS. 1 and 2. The aspect ratio (R) is defined as the ratio of the length (L) to the outside diameter (D):

$$R=L/D \qquad (1)$$

Figure 3:
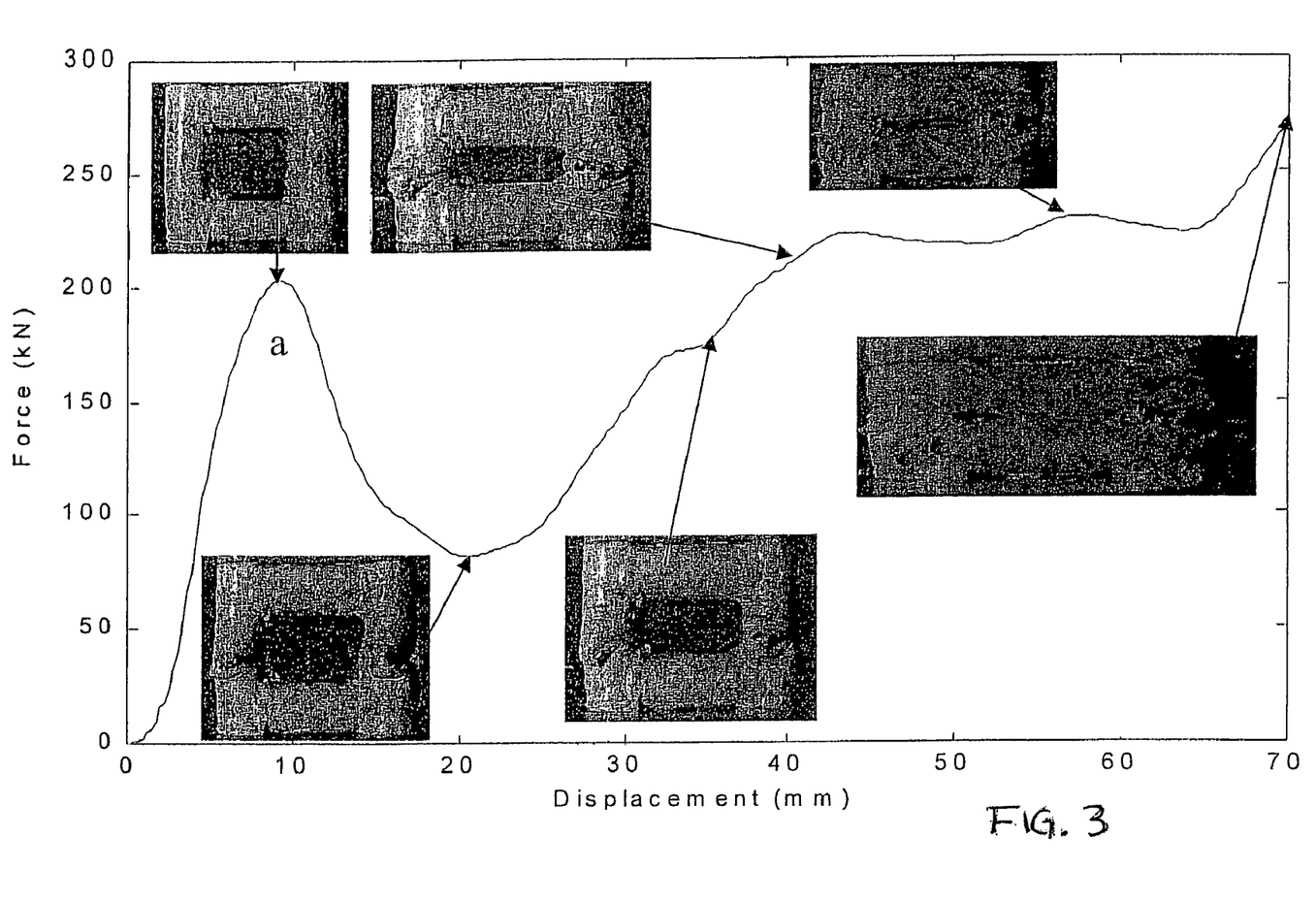
FIG. 3 is a graphic representation of the load or force applied versus displacement curve for a typical cubic structure of the invention.
Figure 4:
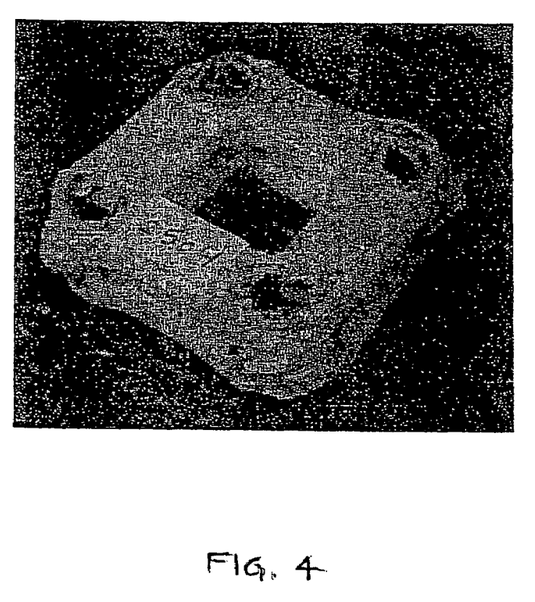
FIG. 4 is an illustration of a cubic impact absorber of the invention at the conclusion of the testing.

An absorption curve for crushing the marine cubic tubular absorber is shown in FIG. 3 in which the load (kN) is plotted against the displacement in millimeters (mm).

Five photographs taken at different intervals during the crushing tests are included in FIG. 3, with lead lines indicating their respective positions on the curve. Crushing starts at the origin on the graph and the load increases at a low rate in the first few millimeters because the tubular elements are not yet fully loaded due to the distortion of the unit during welding. The load increases sharply to a peak value identified as position a. At this point in the test, the first photograph was taken at 10-mm displacement. The progressive plastic buckling of the tubes normal to the plane of the applied force starts at position a. The deformation mode illustrated is a diamond asymmetric mode with two lobes. The photo taken at 20-mm displacement clearly shows the asymmetric deformation of the normal tubes. Although the tubes forming the vertical planes are not yet deformed, the eight joints undergo plastic deformation, with the horizontal tubes providing boundary constraints for the axial deformation of the normal tubes and also undergoing some localized deformation.

The progressive collapse starts at either the upper or the lower sides of the vertical tubes, but with no general pattern for this distribution. The photos at 30-mm and 40-mm displacement were taken while the load is increasing due to the resistance of the second convolution formation. Because of the short vertical tubes, the second convolution in the vertical tubes did not proceed independently and deformation extends into the eight joints as shown in the photo taken at 56-mm displacement.

Interaction between the axial crushing of the four vertical tubes and lateral flattening of the eight horizontal tubes continues while indirect lateral deformation of the horizontal tubes takes place after a 40-mm displacement. The flattening is indirect because there is no direct contact between opposite horizontal tubes, and the flattening is achieved through the eight joints. This indirect flattening is shown in the frame taken at 56-mm displacement. At 64-mm displacement the upper horizontal tubes touch the lower ones, causing a sudden increase in the resistance to the load. The test was stopped at 70.64-mm displacement when the maximum permissible load of the testing machine was reached.

Figure 5:
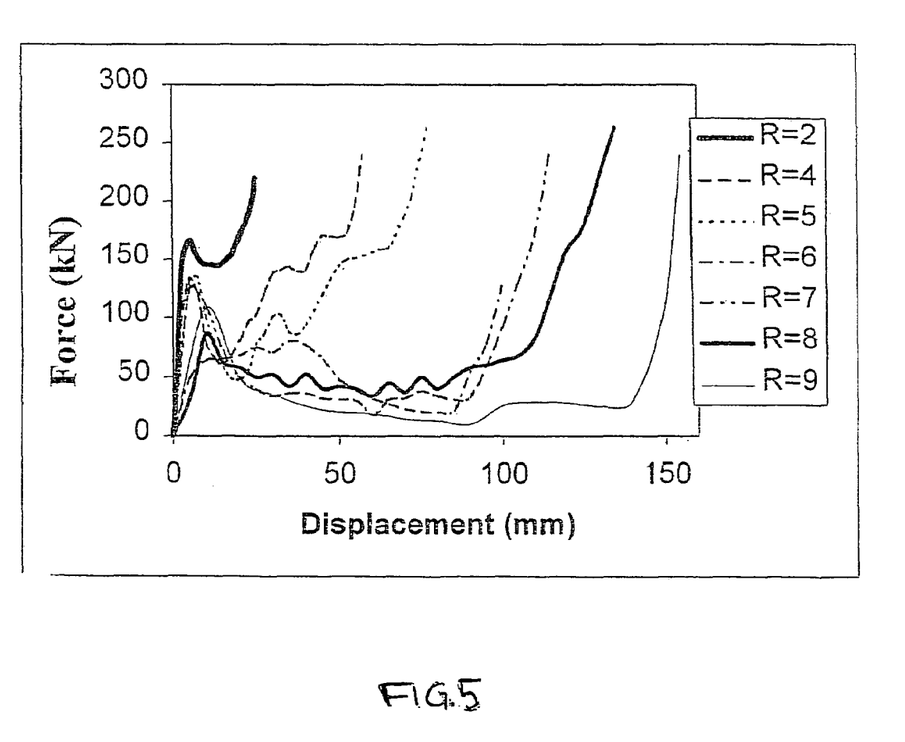
FIG. 5 is a graphic representation of load versus displacement curves for absorbers having different aspect ratios.

Cubic impact-absorbing structures with different aspect ratios, but the same outer diameter were also tested. Representative curves are shown in FIG. 5. As shown by these curves, as the aspect ratio increases, the absorber size increases and the crushing distance also increases. As the aspect ratio was increased, the plastic deformation pattern changed from progressive plastic crumpling into global plastic bending, with one plastic bending hinge in the vertical tubes with a decreasing participation in the force absorption mechanism. From this data, it can be concluded that the mean average force-absorbing capacity of the structure decreases with the increase in the aspect ratio leading to less tube efficiency, i.e., less overall energy absorption protection. In all cases, the load increases to an initial peak and then decreases until the upper horizontal tubes touch the lower ones. Between the initial peak and the second increase in the load, there is no general trend in the behavior of the curve. However, this zone is very much affected by the progressive collapse of the longitudinal tubes. Note the variation in the load due to the successive collapse of the normal or vertical tubes for a small aspect ratio (e.g., R=5), but a steadier decreasing load for large aspect ratio (e.g., R=9), where global plastic buckling at a localized hinge in the middle of vertical tubes dominates the deformation mode.

Based on the test data, an aspect ratio of R=2 requires maximum energy to collapse the structure with four vertical tubes welded together. This maximum energy-absorbing capacity is obtained for the axial crushing mode between two parallel planes, where the force is applied uniformly by the solid plates of the testing machine. Under different loading conditions, such as point loading, line loading or loading between non-parallel plates, different results may be obtained. From a practical marine point of view, an enclosed compact absorber is not a preferred design. An absorber with an aspect ratio R=2 means that the absorber will block the way of traveling water and waves causing high hydrodynamic forces, which are not desirable.

Figure 6:
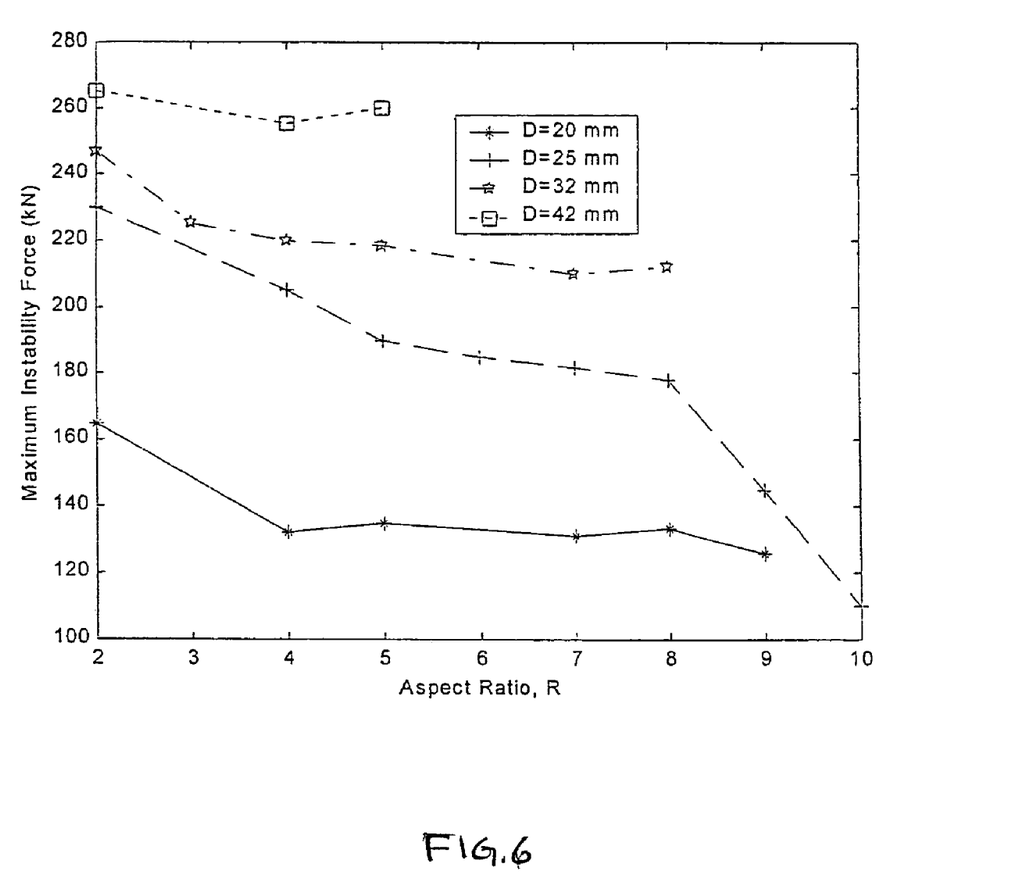
FIG. 6 is a graphic representation of the relation between maximum instability force and aspect ratio.

The relation between maximum instability force and aspect ratio is shown in FIG. 6. As expected, the instability force increases with the increase in the cross-sectional area of the tubes forming the cell, but decreases with the increase in the aspect ratio due to the global buckling effect. A large aspect ratio means a large cell with long vertical tubes that tend to collapse in the Euler buckling mode.

Figure 7:
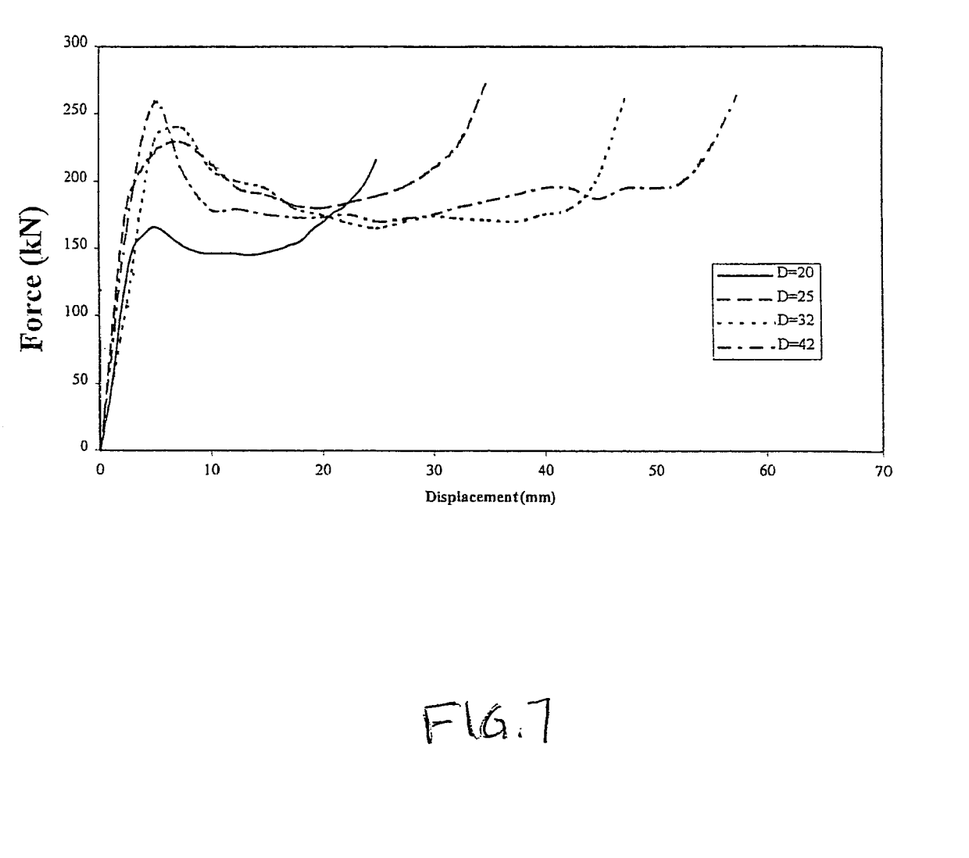
FIG. 7 is a graphic representation of load versus displacement curves for absorbers having the same aspect ratio and different diameters.

FIG. 7 depicts load-deformation curves for cubic cells with the same aspect ratio (R=2), but different outside diameters. The general trend is the same in these curves and the average crushing force increases with the increase in tube diameter. Specific energy attained a high value for D=25 mm. The square wave pattern of the loading curve is desirable in designing impact energy absorbers because it produces a constant deceleration of the vessel and any passengers that may be on board. The uniformity in the load after the initial peak is attributable to the interactions between the progressive plastic buckling of the four normal tubes. The progressive collapse of the four tubes was not simultaneous. Due to welding, the tubes do not react independently and do not follow each other precisely in the crumpling sequence.

Figure 8:
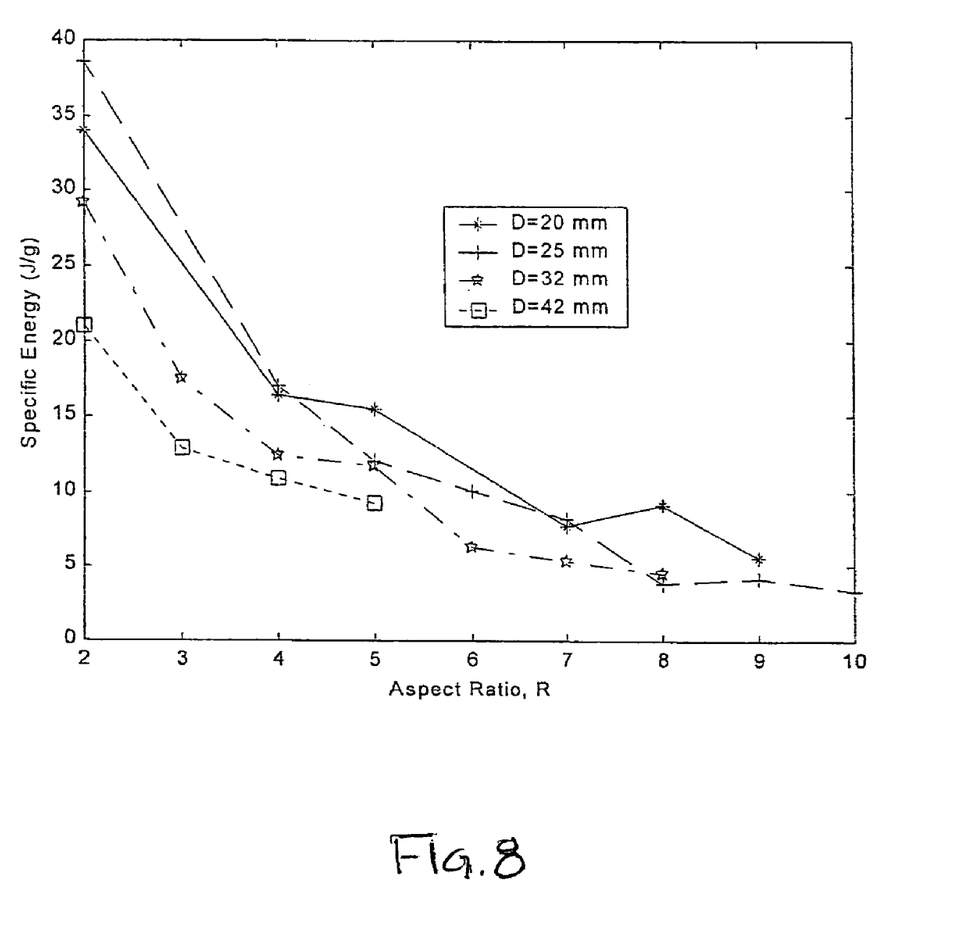
FIG. 8 is a graphic representation of the relation between specific energy and aspect ratio.
Figure 9:
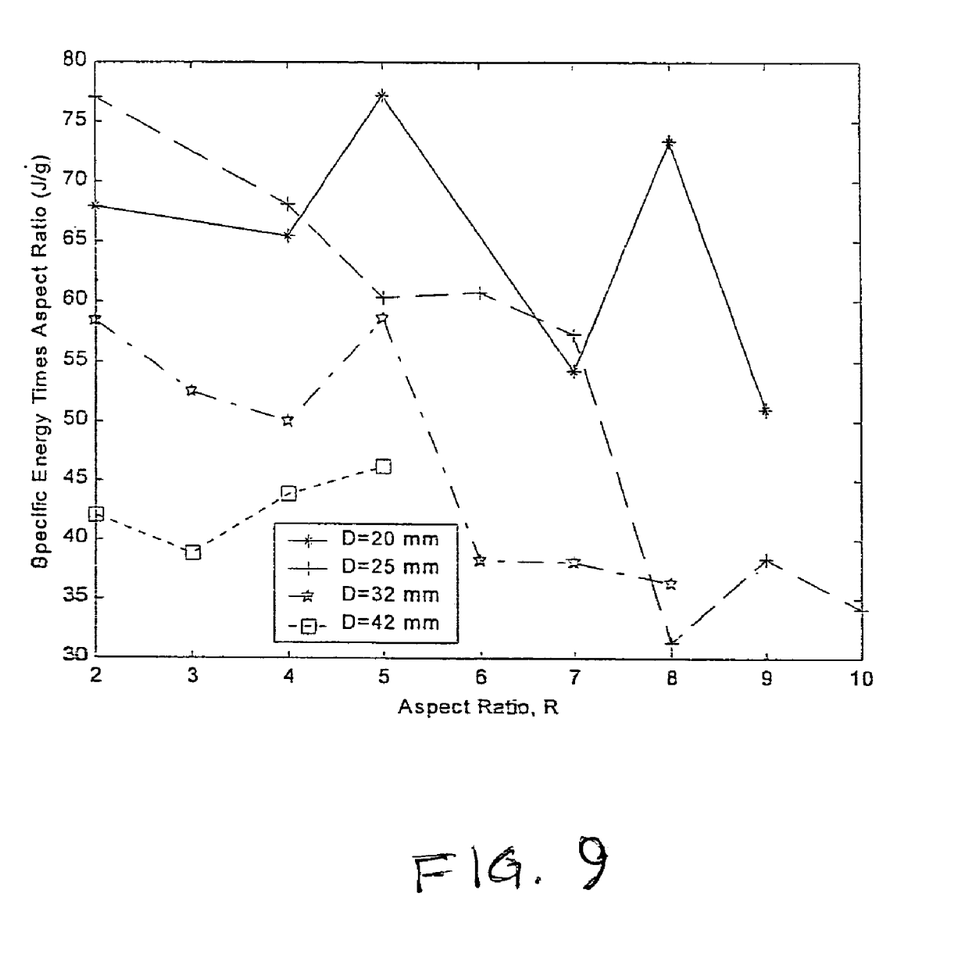
FIG. 9 is a graphic representation of the specific energy multiplied by the aspect ratio versus the aspect ratio.

Specific energy for each specimen is plotted in FIGS. 8 and 9. In FIG. 8, the specific energy (J/g) is plotted vs. the aspect ratio for the four diameters tested. The data establishes that tubes with smaller diameters are more efficient than the larger ones. With reference to the plot of FIG. 9, an aspect ratio of R=5 is optimum based on the higher volume-energy value at this ratio for three of the four sizes tested.

The shape selected for extended testing was circular and the data demonstrates good results with respect to uniform crumpling of the components normal to the impact plane and flattening of the tubes in the vertically oriented planes. However, the invention broadly contemplates the use of tubes having other cross-sections, including square, rectangular and those having arcuate corners and flat or planar sides. Other shapes, such as oval and elliptical can also be utilized, with the longer axis of the ellipse being oriented normal to the plane of impact to maximize the resistance to flattening.

As will also be apparent from the present description to one of ordinary skill in the art, the resistance of the normal tubular members to crumpling under the impact force can be increased by increasing the wall thickness of the tubes. However, in order to serve as a sacrificial impact absorber the tubular members must begin to plastically deform under a load that can be withstood by the marine facility to which the structure is attached. In other words, a damaging force of impact should not be transmitted to the marine facility supports without deformation of the normal members. The size and wall thickness of the tubular members is determined with reference to the nature of the marine facility's construction. Determination of these engineering parameters is within the routine skill in the art.

As will be apparent from the above description of the invention and examples, various modifications and changes in construction methods and materials can be made to the structure without departing from the spirit and scope of the invention as set forth in the claims that follow.

We claim:

1. A sacrificial impact-absorbing structure for mounting on a marine facility to protect the facility from the destructive force of an accidental impact by a marine vessel, the structure comprising:
   a plurality of tubular members permanently secured together to form an open three-dimensional substantially cubic framework, the tubular members being constructed from a plastically deformable material.

2. The structure of claim 1 comprising twelve tubular members secured together at their respective ends.

3. The structure of claim 1, wherein four relatively longer tubular members having their longitudinal axes in parallel alignment are joined at their respective ends by eight relatively shorter tubular members to form the corners of an impact planar array and a second planar array.

4. The structure of claim 1, wherein the tubular members are steel and are secured together by welding.

5. The structure of claim 1, wherein the tubular members are of the same inside and outside diameters.

6. The structure of claim 1, wherein the internal spaces defined by at least a portion of the plurality of tubular members are in fluid communication.

7. The structure of claim 6 which further comprises one or more fluid inlet ports.

8. The structure of claim 7 which further comprises one or more pressure relief devices communicating with the interior space defined by one or more tubular members, whereby pressure transmitted through a fluid by the deformation of the structure is releasable.

9. The structure of claim 1, wherein the interior space defined by one or more of the tubular members is occupied by a material selected from the group consisting of water, a rigid expanded foam composition, wood, and a combination of these materials.

10. The structure of claim 8, wherein the pressure relief devices are actuated at a predetermined pressure transmitted internally of the tubular member.

11. The structure of claim 10, wherein a plurality of pressure relief devices having different predetermined actuation pressures are installed on one or more of the tubular members.

12. A sacrificial impact-absorbing and energy-dissipating structure for mounting on a marine facility to protect the facility from the destructive force of an accidental impact by a marine vessel, the structure comprising:
   a. a first planar array of four tubular members permanently secured together to form a square;
   b. a second planar array of four tubular members permanently secured together to form a square; and
   c. four joining, plastically deformable tubular members, opposing ends of which are permanently secured to corresponding corners of the first and second planar arrays to thereby form a rigid, substantially cubic open framework.

13. The structure of claim 12 in which the tubular members are constructed from a plastically deformable material.

14. The structure of claim 12 in which the tubular members are of substantially equal cross-sectional area and wall thickness.

15. The structure of claim 12, wherein the tubular members have a circular cross-section and the outside diameter and wall thickness of all of the tubular members are the same.

16. The structure of claim 12, wherein the tubular members are steel and are secured together by welding.

17. The structure of claim 16 having an aspect ratio R=5, where R is the ratio of the length of a side of the cubic framework to the outside diameter of a circular tubular member.

18. The structure of claim 16, wherein the tubular members are provided with a rust-resistant coating.

19. The structure of claim 12, wherein the interior spaces of two or more of the tubular members comprising the framework are in fluid communication.

20. The structure of claim 19, wherein the fluid communication is provided by a single opening in a first tubular member at its juncture with a second member.

* * * * *